UNITED STATES PATENT OFFICE.

HIPPOLYT SAURER, OF ARBON, SWITZERLAND.

APPARATUS FOR PERFORATING JACQUARD-CARDS.

1,225,365. Specification of Letters Patent. Patented May 8, 1917.

Application filed November 14, 1911. Serial No. 660,267.

*To all whom it may concern:*

Be it known that I, HIPPOLYT SAURER, a citizen of the Republic of Switzerland, residing at Arbon, Switzerland, have invented new and useful Improvements in Apparatus for Perforating Jacquard-Cards; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the production of jacquard cards, for example, of those for automatic embroidering machines, each time when the pointer, for example, the pin of the pantograph, is moved to a determined point of the pattern and a stroke is thereafter made by the perforating device, the following is usually the mode of operation with all forms of apparatus hitherto employed.

Phase 1. By displacing the pointer pin of the pantograph or measuring mechanism on the pattern board of the apparatus, the selecting devices or devices for controlling the perforators or perforating elements (as drums with holes or pins) are moved from a zero position into the position corresponding to the stitch to be made.

Phase 2. By displacing the paper with relation to the perforators held in a determined position, a perforating operation is performed, causing one or several perforations to be made in the paper, after which the pointer pin of the pantograph is disconnected from the selecting devices controlling the perforators.

Phase 3. The devices controlling the perforators are returned to zero position.

Phase 4. The pointer of the pantograph is connected again to the selecting devices controlling the perforators.

Thereafter by again moving the pointer of the pantograph to another point of the pattern the same mode of operation produces by an operation of the perforators one or several other perforations in the jacquard card.

All of the phases of each complete cycle of operations must be performed within the period of a single revolution of the main shaft. For executing the first phase of operation, i. e., the movement of the pointer, there is at the disposal of the workman only from one-third to one-half of the time required for one revolution of the main shaft.

Attempts have been made in embroidering machines, with more or less success, to lengthen the time at the disposal of the operator for making the movement of the stitch measuring mechanism, without decreasing the speed of the machine.

An analogous lengthening of the time at the disposal of the operator of a card punching or perforating machine is not so readily accomplished, because the selecting mechanism must be returned to zero position after each punching operation.

My invention has for its object to increase the time at the disposal of the operator, and comprises a well known type of stich measuring mechanism, that is, mechanism adapted to measure distance on a pattern; also a plurality of selecting mechanisms controlled by the stitch measuring mechanism, specifically, a plurality of selecting mechanisms pertaining to the vertical component of stitches, and a like number of selecting mechanisms pertaining to the horizontal component of stitches.

It comprises also mechanism arranged between the stitch measuring mechanisms and their selecting mechanisms to cause the measuring mechanisms to operate alternately their respective selecting mechanisms.

The several selecting mechanisms control or select the punches of a set of punches that are to perforate the card, and this set of punches is common to and is alternately and selectively operated by the selecting mechanisms, all as will be hereinafter more particularly described and claimed.

The operation of such a machine increases the time at the disposal of the operator, and in the specific structure illustrating my invention theoretically, at least, doubles the customary time, and, conversely, if the operator is a skilled operator and requires no more than the customary time, then the speed of the machine will be doubled, theoretically.

The accompanying drawing shows an apparatus for carrying out the invention.

Figure 1:
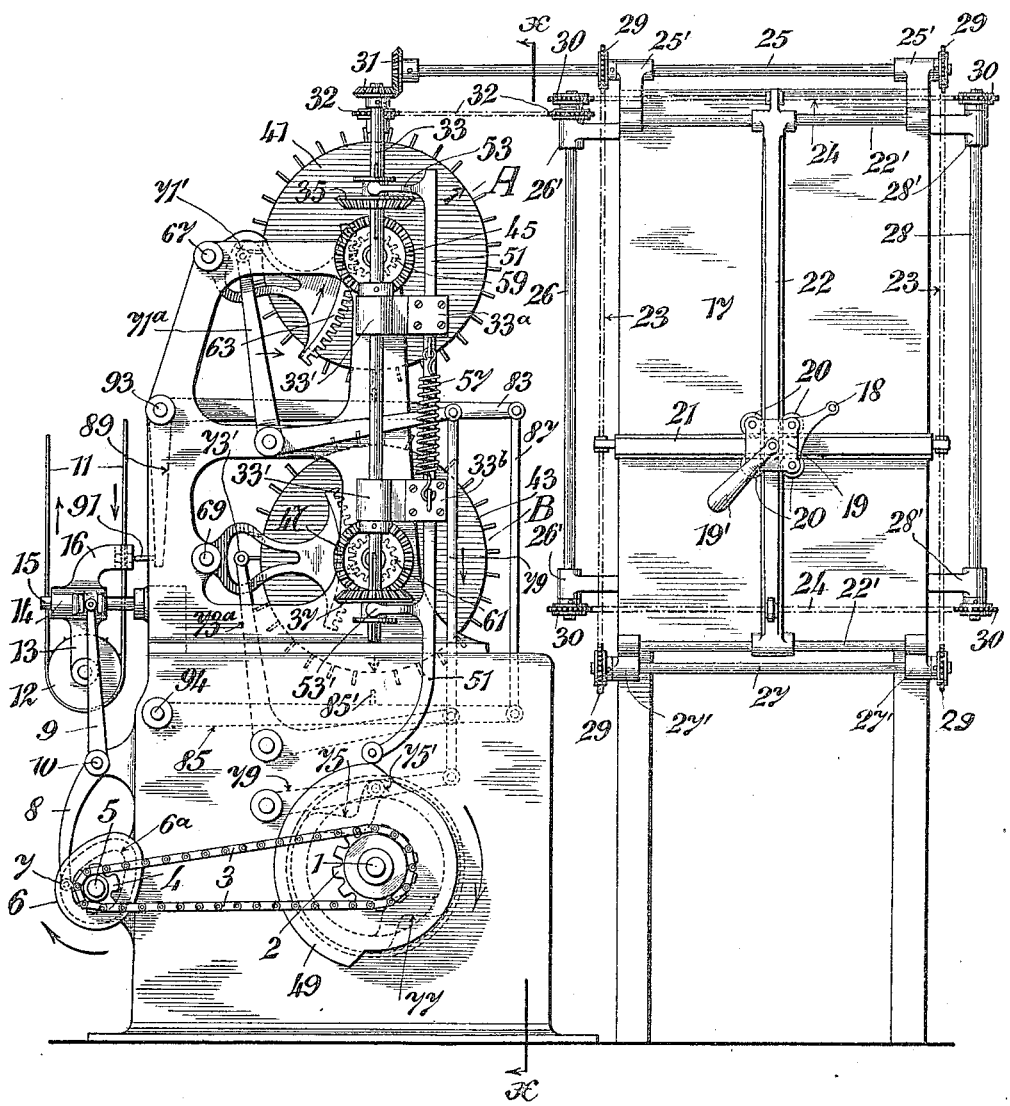
Figure 1 is a side elevation of a mechanism constructed according to my invention.
Figure 2:
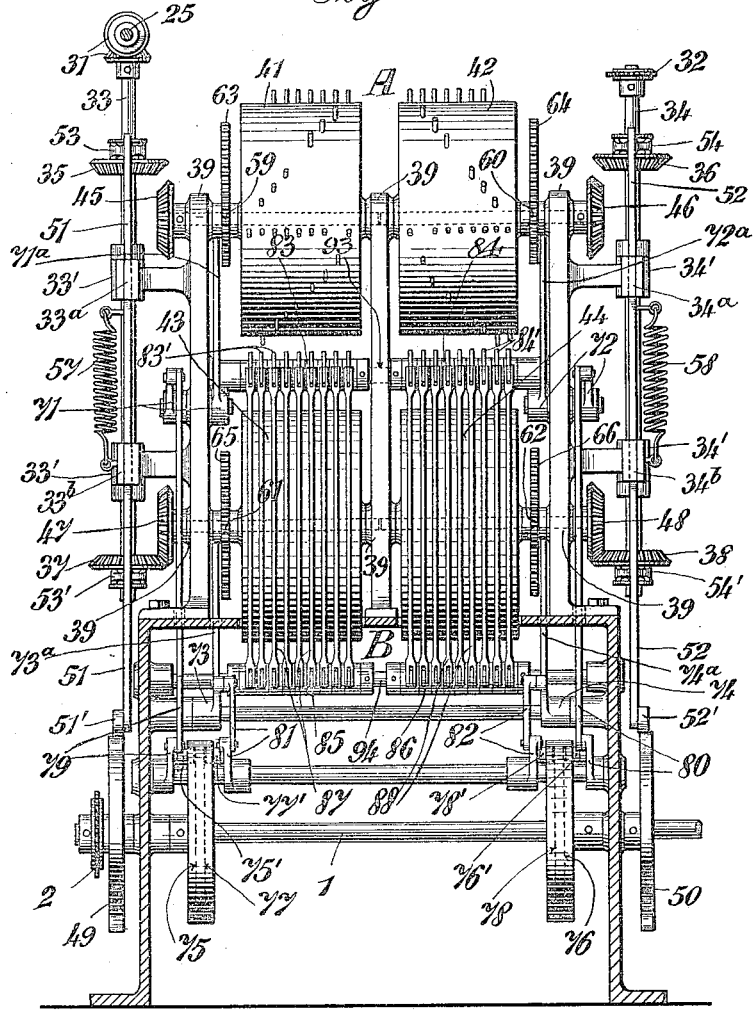
Fig. 2 is a section on line $x$—$x$ of Fig. 1.
Figure 3:
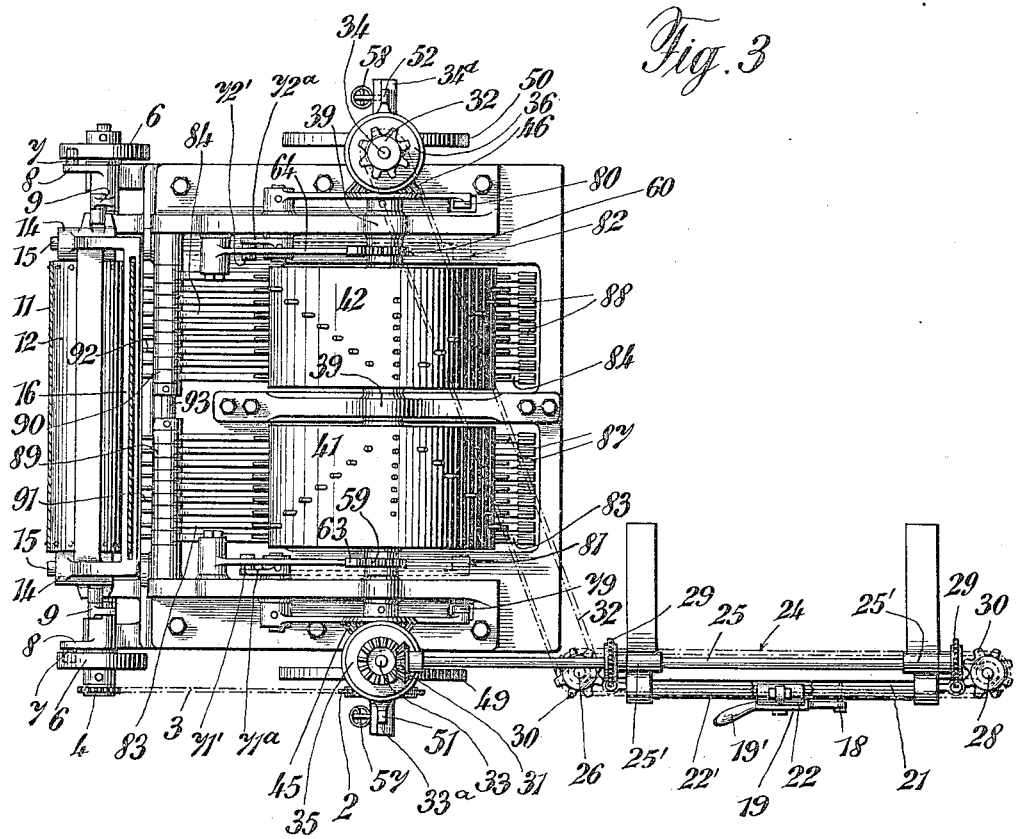
Fig. 3 is a plan view of the same.

To the main shaft 1 is secured a chain wheel 2, which is connected to another chain wheel 4 by a chain 3. To the shaft 5 of the chain wheel 4 is secured a disk 6 with a cam slot 6ᵃ engaged by a pin 7. This pin is connected to the arm 8 of the double armed lever 8, 9, which is mounted to oscillate about the pivot 10. The ratio of gearing of the shafts 1 and 5 is equal to 2:1.

The jacquard card 11 to be perforated is guided by a pulley 12 and movable by suitable means in the direction of the arrow in Fig. 1. The pulley 12 is carried by an arm 13 forming part of a slide 14. This slide can be moved to-and-fro on a guide 15 in a direction at right angles to the jacquard card, the jacquard card being guided therewith by an arm 16 forming part of the slide 14. This movement is caused by the lever 8, 9, mounted on the pivot 10, the arm 9 of said lever being pivotally connected to the slide 14, and an operating movement being imparted to the lever by the cam disk 6.

The pointer 18 of the pantograph is mounted in a carrier 19 in front of the pattern board 17 and is moved by means of a handle 19'. The motions of the pointer 18 are transmitted to rails 21 and 22 by rolls 20 mounted on the carrier, and are converted thereby into a vertical and a horizontal component, the vertical component being imparted to the rail 21 and the horizontal component to the rail 22 movable horizontally on guides 22'. To the rail 21 are connected chains 23 imparting motion to chain wheels 29 secured to shafts 25, 27, while to the rail 22 are connected chains 24 imparting motion to chain wheels 30 secured to the shafts 26, 28. The shafts 25 to 28 are mounted to turn in bearings 25' to 28' respectively. The motion of rotation corresponding with said vertical component is transmitted from the shaft 25 by means of bevel gears 31 to the shaft 33 rotatably supported by bearings 33', and the motion of rotation corresponding with said horizontal component is transmitted from the shaft 26 by means of the chain drive 32 to the shaft 34 rotatably supported by bearings 34'. Bevel wheels 35, 37 and 36, 38 are slidably mounted on shafts 33 and 34, but are prevented from turning with regard to the shafts.

The drums 41, 42, 43, 44 of the perforating devices are mounted to turn in bearings 39. Bevel wheels 45, 46, 47, 48 are secured to the axles of the drums. By displacing the bevel wheels 35, 36, 37 and 38 on the shafts 33 and 34 the bevel wheels 35, 36, 37 and 38 can be brought into mesh with the bevel wheels 45, 46, 47 and 48 respectively, so that motion of rotation corresponding with said vertical component can be imparted to the drums 41 and 43, and motion of rotation corresponding with said horizontal component to the drums 42 and 44.

To displace axially the toothed wheels 35—38 on the shafts 33 and 34 there are two equal cam disks 49 and 50, equi-angularly secured to the main shaft. Against the cam disks are pressed rolls 51' and 52' carried by rods 51 and 52. The rods 51 and 52 are vertically movable in guides 33ᵃ and 33ᵇ, 34ᵃ, 34ᵇ connected to the bearings 33', 34', and engage by projecting arms 53, 53', and 54, 54' annular grooves of the bevel wheels 35—38. The rolls 51' and 52' are pressed against the cam disks 49 and 50 by springs 57, 58, one end of which is secured to the fixed guides 33ᵇ, 34ᵇ, while the other end is secured to the rods 51 and 52.

To move the drums 41—44 to zero position there are secured toothed wheels 59, 60, 61, 62 to the axles of the drums. The wheels are engaged by toothed segments 63, 64, 65, 66, which are provided in their webs with heart-shaped openings and are mounted to turn about journals 67, 68, 69, and a journal corresponding to 69 on the opposite side of the machine and not shown. Crank levers 71, 72, 73, 74, are pivotally mounted on the frame of the machine. The arms 71ᵃ, 72ᵃ, 73ᵃ, 74ᵃ of the crank levers carry at their ends pins 71', 72', 73', 74', which pass through the heart-shaped openings of the toothed segments. The drums 41 to 44 are in zero position when the toothed segments 63 to 66 are horizontal and the arrows shown on the drums in Figs. 1 and 4 directed downward. The movement, for instance, of the toothed segment 63 is performed by a rotation of the crank lever 71 in the direction of the arrow (Figs. 1 and 4), whereby the pin 71' mounted on the arm 71ᵃ of the crank lever turns the toothed segment 63 in the direction of the arrow until the segment is directed horizontally, as shown in dotted lines in Fig. 4.

This rotation of the crank levers is caused by two disks with cam grooves 75, 76, 77, 78, on either side, mounted on the main shaft 1. The cam grooves are engaged by pins 75', 76', 77', 78', the movements of which are transmitted by rods 79, 80, 81, 82, to the four crank levers 71 to 74, and from there to the four toothed segments 63 to 66. All cam grooves 75 to 78 are of equal shape, but the grooves 77 and 78 are displaced 180 degrees with regard to the cam grooves 75 and 76.

The peripheral surface of the drums 41 to 44 is provided in the well known manner with a pattern scale of pins which are arranged in rows in radial planes as well as in axial direction. Corresponding with the former rows there is arranged a number of rods 83, 85, for the vertical, and 84, 86, for the horizontal component, which are separately movable on pivots 93 and 94. Each rod 83 is pivotally connected to the corresponding rod 85 by link 87, and each rod 84 is connected in the same manner to the corresponding rod 86 by a link 88. Each of the rods 83 to 86 carries a pin (83' to 86') to be brought into contact with the pins on the drums 41 to 44. To the rods 83, 84, are rigidly secured arms 89, 90, carrying the punches 91 for the vertical and 92 for the horizontal component. The rods 83 to 86 and their pins constitute connected pairs of feelers coöperating with the drums.

The drums 41, 42 with corresponding parts form a first complete perforating device or mechanism A, while the drums 43, 44, with corresponding parts form a second complete perforating device or mechanism B.

The operation of the apparatus is as follows:

Each complete cycle of operation has four phases, as described above. A first cycle of operation may be performed by the perforating device A, a second cycle of operation by the device B, a third cycle by the device A again, a fourth cycle by the device B, and so on.

Figure 4:
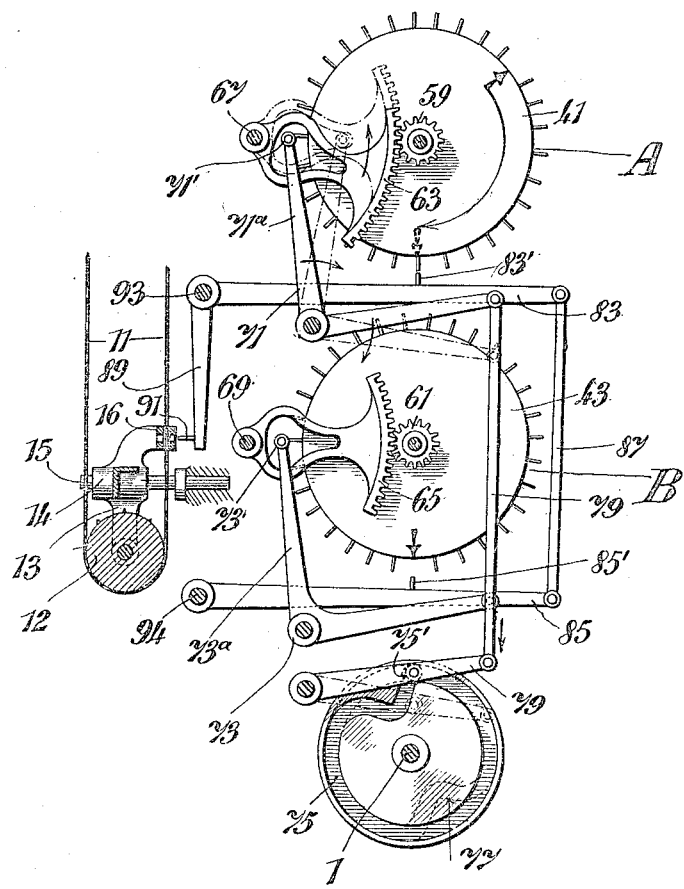
Fig. 4 is a diagrammatic view of a detail.

In the position of Figs. 1 and 4, by rotation of the main shaft 1 in the direction of the arrow in Fig. 1, the perforating device A first performs the third phase of the first cycle, that is, the pins 75', 76' are moved downward by the cam grooves 75, 76, whereby the drums 41, 42 of the perforating device A are moved to zero position by means of the rods 79, 80, the crank levers 71, 72, and the toothed segments 63, 64. At the same time when the perforating device A performs the third phase of the first cycle, the first phase of the second cycle is performed by the perforating device B, that is, the drums 43, 44, are turned from zero position into the position corresponding with the stitch to be formed under the control of the jacquard card. For this purpose the rods 51, 52 are held in raised position by means of the cam disks 49, 50, so that the bevel wheels 37, 47, and 38, 48, respectively are brought into engagement. Thereby the movements of the rails 21 and 22, caused by a movement of the pointer 18 are transmitted to the drums 43, 44, of the perforating device B.

By further rotation of the main shaft 1 the fourth phase of the first cycle is performed by the perforating device A, that is, the pointer of the pattern board is connected to the perforating device by the cam disks 49 50, permitting the rods 51, 52, to move downward, so that the bevel wheels 35, 45, and 36, 46, respectively, are brought into engagement. While the perforating device A thus performs the fourth phase of the first cycle, the perforating device B performs the second phase of the second cycle, that is, the punching stroke or operation and the disconnection of the pointer 18 from the perforating device. Previously the cam disk 6 has been turned by means of chain 3 in the direction of the arrow (Fig. 1) to such an extent that the jacquard card is moved by means of slide 14 against the punches 91, 92, whereby the card is perforated according to the position of the drums 43, 44. Simultaneously therewith, by the downward movement of the rods 51, 52, the pointer 18 is disconnected from the perforating device B.

By further rotation of the main shaft 1, perforating device A will start, by the first phase of the third cycle, a new cycle of operation, while perforating device B performs the third phase of the second cycle. Thereafter perforating device A performs the second phase of the third cycle, while perforating device B performs the fourth phase of the second cycle, etc.

By the device as described theoretically double the time is available to perform phase 1 as compared with devices hitherto in use, or with the same duration of phase 1 as before, the operation can be performed in half of the time.

I claim—

1. In apparatus for perforating jacquard cards, several perforating devices, means to operate the perforating devices so that one part of the perforating devices executes one portion or phase of working necessary for each perforating stroke simultaneously when the other part of the perforating devices executes another portion or phase of working necessary for completing a course of working, but belonging to another perforating stroke.

2. In apparatus for perforating jacquard cards, perforating devices, means to operate the perforating devices so that one perforating device executes one portion or phase of working necessary for a perforating stroke at the same time that the other perforating device executes another portion or phase of working necessary for completing a course of working, but belonging to another perforating stroke.

3. In an apparatus for perforating jacquard cards, the combination with mechanism for measuring the length of a stitch; of perforating devices, and selecting mechanisms between the perforating devices and stitch measuring mechanism for selectively controlling the perforating devices, and means to cause one or more selecting mechanisms to control the punching mechanism while one or more selecting mechanisms are being controlled from the stitch measuring mechanism.

4. In a jacquard card punching machine embodying perforating elements for perforating a jacquard card; means alternately operating for selecting the punching elements at different periods, whereby the selecting means effect different portions of their cycle of operations at different times.

5. A punching machine comprising means for perforating a card, alternately operating selecting means for selecting the perforating means, manually operated means to initiate the movement of the selecting means, and mechanically and automatically operating mechanism to complete the operations of the machine including mechanism for automatically and alternately returning the selecting means to zero position.

6. In a punching machine, two pairs of selecting drums, one drum of each pair for a component of a stitch, stitch measuring mechanism, mechanism to alternately connect the stitch measuring mechanism to the pairs of drums, feelers connected in pairs one feeler pertaining to a drum controlling one stitch and the other feeler pertaining to a similar drum controlling another stitch, a single set of punches operated from the pairs of connected feelers, a set of feelers pertaining to a drum operating only when another drum is in zero position.

7. In a punching machine, two pairs of selecting drums, one drum of each pair for a component of a stitch, stitch measuring mechanism, mechanism to alternately connect the stitch measuring mechanism to the pairs of drums, feelers connected in pairs, one feeler pertaining to a drum controlling one stitch and the other feeler pertaining to a similar drum controlling another stitch, a single set of punches operated from the pairs of connected feelers, a set of feelers pertaining to a drum operative only when another drum is in zero position, and mechanism for independently returning the drums to zero position.

8. In a punching machine, the combination with a pair or superposed selecting drums; of a set of pivoted feelers pertaining to each drum, a link connecting the feeler of one drum to the corresponding feeler of the other drum, a lever rigidly connected to a feeler of each connected pair of feelers, punches on the levers, a card carrying die, and mechanism to move the card carrying die against the punches.

9. In a punching machine, the combination with a pair of superposed selecting drums; of a set of pivoted feelers pertaining to each drum, a link connecting the feeler of one drum to the corresponding feeler of the other drum, a lever rigidly connected to a feeler of each connected pair of feelers, punches on the levers, a card carrying die, and mechanism to move the card carrying die against the punches twice for each cycle of operations of a drum.

10. In a punching machine, the combination with a pair of superposed selecting drums; of a set of pivoted feelers pertaining to each drum, a link connecting the feeler of one drum to the corresponding feeler of the other drum, a lever rigidly connected to a feeler of each connected pair of feelers, punches on the levers, a card carrying die, mechanism to move the card carrying die against the punches twice for each cycle of operations of a drum, and mechanism to move the drums alternately to zero position, the card carrying die always operating during the zero position of one of the drums, thereby rendering one set of feelers inoperative with respect to its drum during the operative movement of the other set of feelers with respect to its drum and vice versa.

11. In a punching machine, stitch measuring mechanism, punches, feelers controlling the operation of the punches, selecting drums coöperating in alternation with the feelers to selectively control the punches, and mechanism to connect the stitch measuring mechanism alternately with different drums.

In testimony that I claim the foregoing as my invention, I have signed my name in presence of two subscribing witnesses.

HIPPOLYT SAURER.

Witnesses:
RANDALL ATKINSON,
ALBERT PHILLIPS.

Copies of this patent may be obtained for five cents each, by addressing the "Commissioner of Patents, Washington, D. C."